United States Patent [19]

Baumstark et al.

[11] Patent Number: 5,652,295
[45] Date of Patent: Jul. 29, 1997

[54] AQUEOUS POLYMER COMPOSITIONS

[75] Inventors: Roland Baumstark, Neustadt; Michael Portugall, Wachenheim, both of Germany

[73] Assignee: BASF Aktinegesellschaft, Ludwigshafen, Germany

[21] Appl. No.: 612,960

[22] PCT Filed: Sep. 27, 1994

[86] PCT No.: PCT/EP94/03224

§ 371 Date: Mar. 11, 1996

§ 102(e) Date: Mar. 11, 1996

[87] PCT Pub. No.: WO95/09896

PCT Pub. Date: Apr. 13, 1995

[30] Foreign Application Priority Data

Oct. 7, 1993 [DE] Germany ............... 43 34 178.0

[51] Int. Cl.$^6$ ............................................. C08L 51/00
[52] U.S. Cl. ............................................. 524/542; 524/354
[58] Field of Search ............................................. 524/542, 354

[56] References Cited

U.S. PATENT DOCUMENTS

| | | | |
|---|---|---|---|
| 2,727,016 | 12/1955 | Hankins et al. | 260/77.5 |
| 2,871,223 | 1/1959 | Hankins et al. | 260/70 |
| 2,881,155 | 4/1959 | Hankins et al. | 260/77.5 |
| 2,980,562 | 4/1961 | Melmamed et al. | 210/77.5 |
| 3,194,782 | 7/1965 | Emmons et al. | 260/77.5 |
| 3,356,627 | 12/1967 | Scott | 260/29.6 |
| 3,455,861 | 7/1969 | Bresciani et al. | 260/29.6 |
| 4,104,220 | 8/1978 | Sims | 260/29.6 R |
| 4,111,877 | 9/1978 | Dixon et al. | 260/27.6 R |
| 4,151,142 | 4/1979 | Herman et al. | 260/29.6 R |
| 4,219,454 | 8/1980 | Iacoviello et al. | 260/29.6 T |
| 4,248,754 | 2/1981 | Fox et al. | 260/29.6 E |
| 4,254,003 | 3/1981 | Fox et al. | 260/29.6 M |
| 4,319,032 | 3/1982 | Sandri et al. | 548/320 |
| 4,500,673 | 2/1985 | Devona et al. | 524/548 |
| 4,559,417 | 12/1985 | Komueo et al. | 179/99 LS |
| 5,157,071 | 10/1992 | Ingle | 524/516 |

FOREIGN PATENT DOCUMENTS

| | | |
|---|---|---|
| 1288537 | 9/1991 | Canada . |
| 3 870 | 9/1978 | European Pat. Off. . |
| 9 880 | 7/1980 | European Pat. Off. . |
| 29 891 | 6/1981 | European Pat. Off. . |
| 184 091 | 6/1986 | European Pat. Off. . |
| 379 892 | 8/1990 | European Pat. Off. . |
| 433 605 | 6/1992 | European Pat. Off. . |

OTHER PUBLICATIONS

Kreis et al., Developments in Ureido Functional Monomer . . . Water–Borne and Higer–Solids COating Symposium of Feb. 3–5, 1988 New Orleans, Louisianna.

*Primary Examiner*—Edward J. Cain
*Attorney, Agent, or Firm*—Keil & Weinkauf

[57] ABSTRACT

Aqueous polymer compositions which contain a polymer having ureido groups and a polyaldehyde compound are suitable for the production of coatings having high adhesion to substrate and having high cohesion.

7 Claims, No Drawings

AQUEOUS POLYMER COMPOSITIONS

This application is a 371 of PCT EP 94/03224 filed Sep. 27, 1994.

DESCRIPTION

The present invention relates to aqueous polymer compositions containing

A) at least one polymer A dissolved and/or dispersed in an aqueous medium and composed of polymerized monomers having at least one ethylenically unsaturated carbon-carbon bond, with the proviso that the polymer A has at least one group of the general formula I

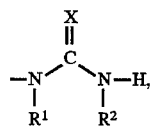

where

X is O or S and $R^1$ and $R^2$ are each hydrogen or $C_1-C_5$-alkyl or both together form a bridging $C_2-C_4$-alkylene group which may be monosubstituted or disubstituted by $C_1-C_4$-alkoxy and/or by hydroxyl, B) at least one chemical compound B having at least two unprotected and/or reversibly protected aldehyde groups, with the proviso that the molar ratio R of the total amount of groups I contained in the aqueous polymer composition to the total molar amount of unprotected and/or reversibly protected aldehyde groups contained in said composition in the form of compounds B is from 0.1:1 to 10:1, and C) no hydrazide.

The present invention furthermore relates to processes for the preparation of such aqueous polymer compositions and their use. Aqueous solutions or dispersions of polymers composed of polymerized monomers having ethylenically unsaturated carbon-carbon bonds are generally known. It is furthermore generally known that, on evaporation of the aqueous solvent or dispersant, such aqueous polymer solutions or dispersions have the property of forming cohesive polymer films having a certain adhesive power, and such polymer solutions or dispersions are therefore recommended as binders for a very wide range of compositions for coating, adhesive bonding, sealing or impregnation.

U.S. Pat. No. 3,356,627, U.S. Pat. No. 4,151,142, U.S. Pat. No. 4,219,454, U.S. Pat. No. 4,248,754, U.S. Pat. No. 4,254,003, U.S. Pat. No. 4,319,032, U.S. Pat. No. 4,500,673, U.S. Pat. No. 5,157,071, EP-A 3870, EP-A 9880, EP-A 29 891, EP-A 379 892 and CA-A 1 288 537 disclose that films of polymers which contain groups I exhibit strong adhesion to many materials, such as wood, metal, minerals, paper, textiles and plastic, and in particular to old coatings based on drying oils and/or alkyd resins, said adhesion exhibiting reduced sensitivity, in particular to the action of humidity and moisture (increased wet adhesion).

For many applications, increased cohesion of the polymeric film is simultaneously required in addition to increased adhesion of said film.

EP-A 184 091 recommends aqueous polymer dispersions as binders for non-blocking coatings whose dispersed polymers may contain, as polymerized units, not only ethylenically unsaturated aldehydes but also ethylenically unsaturated monomers having groups I. The disadvantage of EP-A 184 091, however, is that it recommends the copolymerization of ethylenically unsaturated aldehydes in order to increase the cohesion of the coating but assumes that such an increase in the cohesion occurs only when a certain amount, based on the amount of polymerized ethylenically unsaturated aldehyde, of dicarboxylic dihydrazide which chemically binds the aldehyde groups is stirred into the coating material.

EP-A 488 605, which recommends the copolymerization of ethylenically unsaturated monomers having groups I, as formaldehyde acceptors, has disclosed that groups I are capable of forming chemical bonds with aldehyde groups. The copolymers disclosed in EP-A 488 605 may contain a wide range of polymerized monomers, including acrolein.

U.S. Pat. No. 3,455,861 recommends stirring urea/formaldehyde resins, ie. resins which contain groups I, into aqueous polymer dispersions which contain polymerized ethylenically unsaturated aldehydes, in order to increase the cohesion of their films.

In the context of the present invention, it has now been found, surprisingly, that the combination polyaldehyde/polymerized group I increases the cohesion of the polymeric film in accordance with the prior art but the associated chemical reaction between aldehyde groups and groups I essentially does not reduce the adhesion-increasing effect of the groups I.

It is an object of the present invention to provide aqueous polymer compositions which, in the solidified state, exhibit high adhesion on the one hand and at the same time high cohesion on the other hand, without requiring the presence of hydrazides.

We have found that this object is achieved by the aqueous polymer compositions defined at the outset. Of particular importance is the fact that the high cohesion also occurs when film formation is effected without the action of elevated temperatures, whereas the mechanism resulting in the increased cohesion plays essentially no role prior to film formation, and the novel aqueous polymer compositions therefore have a completely satisfactory shelf life.

The polymer A advantageously contains monomers having groups I, polymerized in amounts of from 0.1 to 30, preferably from 0.5 to 10, very particularly preferably from 1 to 5, % by weight, based on the total amount of the monomers polymerized in A. The ratio R is advantageously chosen so that it is from 1:0.1 to 1:2, preferably from 1:0.1 to 1:1 and very particularly preferably from 1:0.5 to 1:1.

Preferred groups I are:

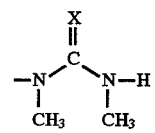

and

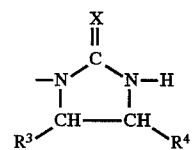

where each of the two substituents $R^3$ and $R^4$ may be hydrogen, hydroxyl or $C_1-C_4$-alkoxy.

Among the latter groups, those in which $R^3$ and $R^4$ are both simultaneously hydrogen or $R^3$ is hydrogen and $R^4$ is $C_1-C_4$-alkoxy are in turn preferred. Very generally, X is preferably oxygen.

Suitable copolymerizable monomers having groups I are those of the general formula II

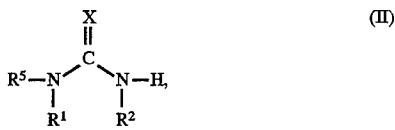

where $R^5$ is a radical which has at least one ethylenically unsaturated C=C bond.

Examples of radicals $R^5$ are:

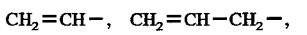

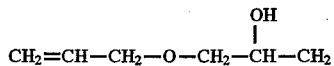

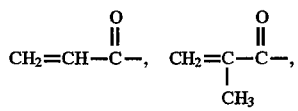

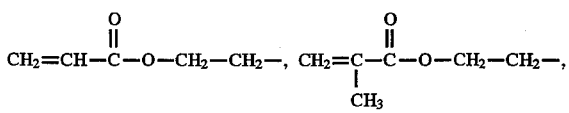

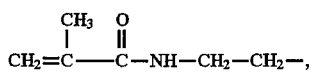

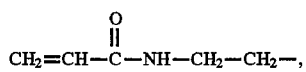

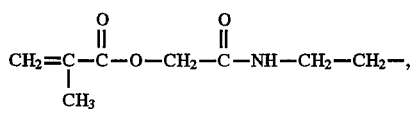

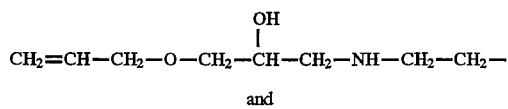

and

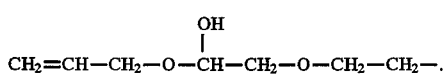

Examples of advantageous copolymerizable monomers II are N-vinylethyleneurea, N-methacryloyloxyacetoxyethylethyleneurea, N-di-(3-allyloxy-2-hydroxypropyl)-aminoethylethyleneurea, N-(acrylamidoethyl)-ethyleneurea, N-(2-acryloyloxyethyl)-ethyleneurea, N-methacrylamidomethylurea, allylalkylethyleneurea, N-(2-methacryloyloxyacetamidoethyl)-N,N'-ethyleneurea and in particular N-(2-methacryloyloxyethyl)-ethyleneurea (also referred to as 1-(2-methacryloyloxyethyl)-imidazolin-2-one), N-(methacrylamidoethyl)-ethyleneurea and N-(3-allyloxy-2-hydroxypropyl)-aminoethylethyleneurea.

All monomers having groups I and stated in the patents cited at the outset as prior art are in principle also suitable. Corresponding monomers are also disclosed in U.S. Pat. No. 2,727,016, U.S. Pat. No. 2,871,223, U.S. Pat. No. 2,881,155, U.S. Pat. No. 2,980,652, U.S. Pat. No. 3,194,792, U.S. Pat. No. 4,104,220, U.S. Pat. No. 4,111,877 and U.S. Pat. No. 4,559,417. Further suitable active monomers II are stated in a review article by R. W. Kreis and A. M. Sherman, Developments in Ureido Functional Monomer for Promoting Wet Adhesion in Latex Paints, Water-Borne and Higher-Solids Coating Symposium of Feb. 3–5, 1988, New Orleans, La.

In addition to the monomers II, monomers which are particularly suitable for producing the polymer A include monoethylenically unsaturated monomers differing from the monomers II, such as styrene, α-methylstyrene, o-chlorostyrene or vinyltoluenes, esters of vinyl alcohol and monocarboxylic acids of 1 to 18 carbon atoms, such as vinyl acetate, vinyl propionate, vinyl n-butyrate, vinyl laurate and vinyl stearate, esters of α,β-monoethylenically unsaturated mono- and dicarboxylic acids which are preferably of 3 to 6 carbon atoms, and in particular acrylic acid, methacrylic acid, maleic acid, fumaric acid and itaconic acid, with alkanols of in general 1 to 12, preferably 1 to 8, and in particular 1 to 4, carbon atoms, in particular methyl, ethyl, n-butyl, isobutyl and 2-ethylhexyl acrylate and methacrylate, dimethyl maleate and n-butyl maleate, nitriles of α,β-monoethylenically unsaturated carboxylic acids, such as acrylonitrile, and conjugated $C_4$–$C_8$-dienes, such as 1,3-butadiene and isoprene.

In addition to the monomers II, the stated monomers are as a rule the main monomers which together usually account for more than 50% by weight, based on the total amount of the monomers polymerized in the polymer A.

Monomers which, when polymerized by themselves, usually give homopolymers which have high water solubility are normally also polymerized merely as modifying monomers in amounts of less than 50, as a rule up to 20, preferably from 0.1 to 10, % by weight, based on the total amount of the monomers polymerized in the polymer A. Their amount by weight is chosen to be high when water-soluble polymers A are desired.

Examples of such monomers are α,β-monoethylenically unsaturated mono- and dicarboxylic acids of 3 to 6 carbon atoms and amides thereof, eg. acrylic acid, methacrylic acid, maleic acid, fumaric acid, itaconic acid, acrylamide and methacrylamide, as well as vinylsulfonic acid and its water-soluble salts and N-vinylpyrrolidone.

Commercially available monomers VEOVA® 9-11 (VEOVA X is a trade name of Shell and represents vinyl esters (of carboxylic acids which are also referred to as Versatic® X acids) of the general formula III

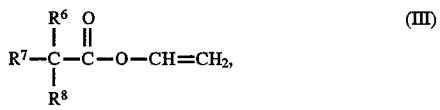

where $R^6$, $R^7$ and $R^8$ are alkyl radicals whose total number of carbon atoms ($R^6+R^7+R^8$) is X minus 2, are also important.

Monomers which have an epoxy, hydroxyl, N-methylol or keto group or at least two nonconjugated ethylenically unsaturated double bonds may also be polymerized as auxiliary monomers in the polymer A. They are present in general in an amount of from 0.5 to 10% by weight, based on the total amount of the monomers polymerized in the polymer A. Examples of such monomers are N-alkylolamides of α,β-monoethylenically unsaturated carboxylic acids of 3 to 10 carbon atoms and esters thereof with alcohols of 1 to 4 carbon atoms, among which N-methylolacrylamide and N-methylolmethacrylamide are very particularly preferred, monomers having two vinyl radicals and monomers having two alkenyl radicals.

Particularly suitable are the diesters of dihydric alcohols with α,β monoethylenically unsaturated monocarboxylic acids, among which in turn acrylic and methacrylic acid are preferably used. Examples of such monomers having two nonconjugated ethylenically unsaturated double bonds are alkylene glycol diacrylates and dimethacrylates, such as ethylene glycol diacrylate, 1,3-butylene glycol diacrylate, 1,4-butylene glycol diacrylate and propylene glycol diacrylate, divinylbenzene, vinyl methacrylate, vinyl acrylate, allyl methacrylate, allyl acrylate, diallyl maleate, diallyl fumarate, methylenebisacrylamide, cyclopentadienyl acrylate and triallyl cyanurate. The $C_1$–$C_8$-hydroxyalkyl methacrylates and acrylates, such as hydroxyethyl, n-hydroxypropyl or n-hydroxybutyl acrylate and methacrylate, and compounds such as diacetoneacrylamide and 2-(acetoacetoxy)-ethyl acrylate and methacrylate are also important in this context.

The one or more polymers A are advantageously prepared by the free radical polymerization method. In principle, however, the ionic solution polymerization processes may also be used. If the unsaturated monomers are polymerized in solution in organic solvents, said solution is transferred to an aqueous medium after the end of the polymerization, and the organic solvent is removed, generally by distillation. If the polymer A is insoluble in the aqueous medium, dispersants are generally added and an aqueous secondary dispersion of the polymer A is thus produced. In the case of water-insoluble polymers A, the free radical aqueous emulsion polymerization method is however preferably used for the polymerization, in the course of which an aqueous polymer dispersion, a primary dispersion, is directly obtained.

Suitable dispersants are both the protective colloids usually used for carrying out free radical aqueous emulsion polymerizations and emulsifiers. Examples of suitable protective colloids are polyvinyl alcohols, cellulose derivatives and vinylpyrrolidone-containing copolymers. A detailed description of further suitable protective colloids appears in Houben-Weyl, Methoden der organischen Chemie, volume XIV/1, Makromolekulare Stoffe, Georg-Thieme-Verlag, Stuttgart, 1961, pages 411 to 420. Mixtures of emulsifiers and/or protective colloids may of course also be used. It is preferable to use as dispersants exclusively emulsifiers with relative molecular weights which are usually below 1000, in contrast to the protective colloids. Said emulsifiers may be anionic, cationic or nonionic.

Where mixtures of surfactants are used, the individual components must of course be compatible with one another, which in case of doubt may be checked by means of a few tests. In general, anionic emulsifiers are compatible with one another and with nonionic emulsifiers. The same also applies to cationic emulsifiers, whereas anionic and cationic emulsifiers are generally incompatible with one another. Customary emulsifiers are, for example, ethoxylated mono-, di- and trialkyl phenols (degree of ethoxylation: from 3 to 50, alkyl radical: $C_4$–$C_9$), ethoxylated fatty alcohols (degree of ethoxylation: from 0 to 50, alkyl radical: $C_8$–$C_{36}$) and alkali metal and ammonium salts of alkylsulfates (alkyl radical: $C_8$–$C_{12}$) and of sulfuric half-esters of ethoxylated alkanols (degree of ethoxylation: from 0 to 30, alkyl radical: $C_{10}$–$C_{18}$) and ethoxylated alkylphenols (degree of ethoxylation: from 3 to 50, alkyl radical: $C_4$–$C_{15}$), of alkylsulfonic acids (alkyl radical: $C_{12}$–$C_{18}$) and of alkylarylsulfonic acids (alkyl radical: $C_9$–$C_{18}$). Other suitable emulsifiers appear in Houben-Weyl, Methoden der organischen Chemie, volume XIV/1, Makromolekulare Stoffe, Georg-Thieme Verlag, Stuttgart, 1961, pages 192 to 208.

Further suitable surfactants are compounds of the general formula IV

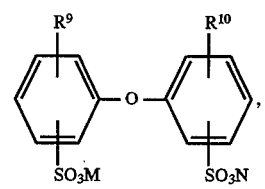

(IV)

where $R^9$ and $R^{10}$ are each hydrogen or $C_4$–$C_{24}$-alkyl and are not simultaneously hydrogen, and M and N may be alkali metal ions and/or ammonium ions. In the formula IV, $R^9$ and $R^{10}$ are each preferably linear or branched alkyl of 6 to 18, in particular 6, 12 or 16, carbon atoms or hydrogen, and $R^9$ and $R^{10}$ are not both simultaneously hydrogen. M and N are each preferably sodium, potassium or ammonium ions, sodium being particularly preferred. Compounds (IV) in which M and N are each sodium, $R^9$ is branched alkyl of 12 carbon atoms and $R^{10}$ is hydrogen or $R^9$ are particularly advantageous. Industrial mixtures which contain from 50 to 90% by weight of the monoalkylated product, for example Dowfax® 2A1 (trade mark of DOW Chemical Company), are frequently used. The compounds IV are generally known, for example from U.S. Pat. No. 4,269,749, and are commercially available. The novel aqueous polymer dispersion advantageously contains from 1 to 5% by weight, based on the mass of the final polymer, of surfactants.

Suitable free radical polymerization initiators are all those which are capable of initiating a free radical aqueous emulsion polymerization. These may be both peroxides, for example alkali metal peroxodisulfates, and azo compounds. Combined systems which are composed of at least one organic reducing agent and at least one peroxide and/or hydroperoxide, eg. tert-butyl hydroperoxide and the sodium salt of hydroxymethanesulfinic acid or hydrogen peroxide and ascorbic acid, and very particularly preferably combined systems which furthermore contain a small amount of a metal compound which is soluble in the polymerization medium and whose metallic component may occur in a plurality of valent states, for example ascorbic acid/iron(II) sulfate/hydrogen peroxide, are also advantageously used, the sodium salt of hydroxymethanesulfinic acid, sodium sulfite, sodium bisulfite or alkali metal peroxodisulfates and/or ammonium peroxodisulfate also frequently being used instead of ascorbic acid. A V salt or a combination of water-soluble Fe/V salts is frequently used instead of water-soluble iron(II) salt. The amount of the free radical initiator system used is preferably from 0.1 to 2% by weight, based on the total amount of the monomers to be polymerized.

The polymerization pressure and polymerization temperature tend to be of minor importance. In general, the polymerization is carried out at from room temperature to 100° C., preferably from 50° to 95° C. The use of superatmospheric or reduced pressure is possible, so that the polymerization temperature may also exceed 100° C. and may up to 130° C. Readily volatile monomers, such as ethylene, butadiene or vinyl chloride, are preferably polymerized under superatmospheric pressure. To regulate the pH of the polymerization medium, for example, ammonia or an alkali metal hydroxide may be added during the novel free radical aqueous emulsion polymerization.

As a rule, the free radical aqueous emulsion polymerization is carried out batchwise, in general some of the polymerization batch being initially taken in the polymerization vessel and heated to the polymerization temperature and the remainder of the polymerization batch being fed into the polymerization vessel while maintaining the polymerization temperature. Advantageously, the initially taken mixture comprises an aqueous seed polymer dispersion known per se to a person skilled in the art, which promotes the polymerization process.

In the feed process, monomers and initiators are preferably fed in via feeds at separate points. The monomers are advantageously added in a form preemulsified in an aqueous medium. Of course, the composition of the monomers to be added may change during the feed process. This change may take place stepwise or gradually and continuously. A particularly preferred monomer sequence is described in EP-A 184 091. As a rule, the free radical aqueous emulsion polymerization is carried out in such a way that the resulting polymer content is from 10 to 80% by weight, based on the dispersion. The number average particle diameter of the disperse polymer particles is controlled, in a manner known per se to a person skilled in the art, by suitable choice of the amount of emulsifier, so that said particle diameter is from 10 nm to 3 µm. The light transmittance (LT value) of the aqueous polymer dispersion is a measure of the average diameter of the disperse polymer particles. Measurement is usually carried out with a commercial photometer at a wavelength of 0.546 µm and a path length of 25 mm, relative to water. Water is assigned an LT value of 100. The reference temperature is 25° C.

If the preparation of the polymer A is carried out by the free radical polymerization method, minor amounts, usually from 0.01 to 2% by weight, based on the monomers to be polymerized, of molecular weight regulators, such as tert-dodecyl mercaptan or 3-mercaptopropyltrimethoxysilane, may be polymerized in addition to monomers containing unsaturated C═C double bonds. Such substances are preferably added to the polymerization zone in the form of a mixture with the monomers to be polymerized.

Apart from the active monomers II, the composition of the other monomers constituting the polymer A is preferably chosen so that, according to Fox's relationship, a glass transition temperature of from −30° to 50° C., particularly preferably from −10° to 30° C., results for a polymer composed only of the remaining monomers constituting the polymer A (referred to below as R monomers). According to Fox (T. G. Fox, Bull. Am. Phys. Soc. (Ser. II) 1, (1956), 123), a good approximation for the glass transition temperature of copolymers is $$\frac{1}{T_g} = \frac{X^1}{T_g^1} + \frac{X^2}{T_g^2} + \ldots \frac{X^n}{T_g^n},$$

where $X^1, X^2, \ldots, X^n$ are the mass fractions of the monomers $1, 2, \ldots, n$ and $T_g^1, T_g^2, \ldots, T_g^n$ are the glass transition temperatures, in degrees Kelvin, of the polymers composed in each case only of one of the monomers $1, 2, \ldots$ or $n$. The glass transition temperatures of these homopolymers are known for most monomers and are stated, for example, in J. Brandrup and E. H. Immergut, Polymer Handbook 1$^{st}$ Ed., J. Wiley, New York 1966, 2$^{nd}$ Ed. J. Wiley, New York 1975, and 3$^{rd}$ Ed. J. Wiley, New York, 1989.

Preferred polymers A are those whose R monomers are composed of from 70 to 100% by weight of esters of acrylic and/or methacrylic acid of alkanols of 1 to 12 carbon atoms and/or styrene, or from 70 to 100% by weight of styrene and/or butadiene, or from 70 to 100% by weight of vinyl chloride and/or vinylidene chloride, or from 50 to 100% by weight of vinyl acetate, vinyl propionate and/or ethylene.

Very particularly preferred polymers A are those whose R monomers are composed of from 70 to 100% by weight of n-butyl acrylate, 2-ethylhexyl acrylate, methyl methacrylate and/or styrene and from 0 to 30% by weight of acrylic acid, methacrylic acid, acrylamide and/or methacrylamide.

Furthermore, very particularly preferred polymers A are those whose R monomers are composed of from 50 to 100% by weight of vinyl acetate, vinyl propionate and/or ethylene, from 0 to 50% by weight of 2-ethylhexyl acrylate, n-butyl acrylate, tert-butyl acrylate and/or VEOVA 9,10 and from 0 to 5% by weight of acrylamide, vinylsulfonic acid, the salts of vinylsulfonic acid, acrylic acid and/or methacrylic acid.

If the glass transition temperature of the polymer A of the novel aqueous polymer compositions is too high for the intended use, this can be compensated by adding plasticizers in the manner known per se to a person skilled in the art.

Component B of the novel aqueous polymer compositions may differ from component A or be the same as component A. In the latter case, polymer A must contain the corresponding amount of ethylenically unsaturated aldehydes as polymerized units. Examples are acrolein, methacrolein, formylstyrene, crotonaldehyde, cinnamaldehyde, citral and alkyl (meth)acrylates having one or two aldehyde groups in the alkyl radical, eg. (meth)acryloyloxyalkylpropanals, as described in DE-A 2 722 097. In addition to copolymerizable aldehydes, however, copolymerizable monomers which have reversibly protected aldehyde groups, for example hemiacetals or acetals, which are stable in the alkaline range but in the acidic range are cleaved into aldehyde and alcohol, are also suitable. These are preferably $C_1$–$C_4$-alcohols. Examples are (meth)acrylamide derivatives which carry terminal acetal groups in the amide moiety, eg. N-(1,1-dimethoxybut-4-yl) methacrylamide or acrylamidobutyraldehyde diethoxyacetal.

However, component B of the novel aqueous compositions preferably differs from component A (ie. polymer A preferably contains no aldehyde groups) and is merely stirred into the aqueous polymer compositions. Of course, the component to be stirred in may be polymer B which differs from polymer A and has at least two aldehyde groups and, apart from the active monomers II of the polymer A and the building blocks of polymer B which have the aldehyde groups, may have the same composition as the polymer A. However, component B is preferably a low molecular weight polyaldehyde, particularly preferably a dialdehyde. Examples are 1,ω-dialdehydes of 1 to 10 xscarbon atoms, such as glyoxal and glutardialdehyde or malondialdehyde, and the acetals and hemiacetals thereof. However, compounds such as terephthalaldehyde are also suitable. Glyoxal is particularly advantageously used. Oligomers and polymers of acrolein and/or of methacrolein are also useful. pH of the novel aqueous polymer compositions is not particularly critical for the action mechanism associated with the novel aqueous polymer compositions. It is usually from 2 to 12, preferably from >7 to 12. In order to use them, said polymer compositions may of course be mixed with aqueous polymer compositions which differ from them.

The novel aqueous polymer compositions are particularly suitable for coating, adhesive bonding, sealing or impregnation and, in the solidified state, have high adhesive strength on the substrate and high cohesion. In addition to the obligatory components A and B, they may contain the assistants known per se for this intended use and are tailored to the particular intended use. All that is necessary is substantially to avoid additives having an aldehyde group, since as a rule they reduce the action principle on which the novel aqueous compositions are based. They may be present in no more than minor amounts, ie. at most in a number which is smaller than the number of aldehyde groups introduced in the form of component B.

If the novel aqueous compositions are to be used as an aqueous coating material, it is preferably an aqueous polymer dispersion, the dispersed polymer A preferably having been obtained by the free radical aqueous emulsion polymerization method. In addition to components A (as a rule in an amount of from 5 to 50% by weight, based on the total composition) and component B, in this case the compositions contain in particular inorganic fillers and pigments (eg. silicates, such as talc, or white pigment, such as $TiO_2$) as additional components, as a rule in an amount of from 5 to 75% by weight, and conventional coating assistants, such as dispersants for pigments and fillers, thickeners, antifoams, preservatives or film formation assistants, such as hydrocarbons. The total amount of these assistants is usually from 0 to 15% by weight, based on the total coating composition.

Particularly on old coats based on drying oils and/or alkyd resins, the novel coating compositions exhibit good wet adhesion in conjunction with high cohesion.

EXAMPLE a) Preparation of Aqueous Polymer Dispersions D1 to D3 and DV (Comparison)

D1: In a polymerization vessel, 200 g of water, 75 g of feed 1, 25 g of feed 2, 12.5 g of a 20% strength by weight aqueous solution of a mixture of ethoxylated fatty alcohols ($C_{16/18}$, degree of ethoxylation: 18, emulsifier 1) and 2.5 g of a 20% strength by weight aqueous solution of the active substance corresponding to Dowfax 2A1 (emulsifier 2) were mixed with one another and the mixture was heated to 85° C. Thereafter, the mixture was kept at 85° C. for 15 minutes and, while maintaining the polymerization temperature, the remaining amount of feed 1 was then added to the polymerization vessel (in the course of 2 hours) and, beginning at the same time, the remaining amount of feed 2 was introduced (in the course of 2 hours 15 minutes). The system was then left to stand for a further 2 hours at 85° C. while stirring. After the mixture had cooled to room temperature, 12 g of a 10% strength by weight aqueous sodium hydroxide solution were added.

The LT value of the resulting dispersion was 78 and the solids content was 48.9% by weight.

Feed 1:
  187 g of water,
  25 g of 20% strength by weight aqueous solution of emusifier 1,
  37.5 g of 20% strength by weight aqueous solution of emulsifier 2,
  15 g of 50% strength by weight aqueous solution of acrylamide,
  13.5 g of methacrylic acid,
  10 g of N-(2-methacryloyloxyethyl)-ethyleneurea as active monomer II,
  150 g of methyl methacrylate and
  350 g of n-butyl acrylate Feed 2:
  100 g of water and
  2.5 g of sodium peroxodisulfate DV: As for D1 but without the active monomer II in feed 1.

Solids content: 49.6% by weight, LT value: 76.

D2: As for D1 but feed 1 comprised 18 g instead of 10 g of the active monomer II.

Solids content: 50.3% by weight, LT value: 76.

D3: As for D1 but feed 1 contained 150 g of styrene instead of 150 g of methyl methacrylate.

Solids content: 49.6% by weight, LT value: 63.

b) The following aqueous polymer systems S and SV (comparison) were prepared from 100 ml of each of the aqueous polymer dispersions from a) by stirring in Zg of a 40% strength by weight aqueous solution of glyoxal:

| Polymer system | Dispersion used | Z [g] | Ratio R |
|---|---|---|---|
| SV1 | DV | 0 | — |
| SV2 | DV | 0.32 | 0 |
| SV3 | D1 | 0 | — |
| S1 | D1 | 0.08 | 1:0.25 |
| S2 | D1 | 0.16 | 1:0.5 |
| S3 | D1 | 0.32 | 1:1 |
| S4 | D1 | 0.65 | 0.5:1 |
| SV4 | D3 | 0 | — |
| S5 | D3 | 0.32 | 1:1 |
| SV5 | D2 | 0 | — |
| S6 | D2 | 0.28 | 1:0.5 |
| S7 | D2 | 0.56 | 1:1 | c) Testing of Films of the Polymer Systems S and SV for Cohesion

About 500 µm thick polymer films were prepared from the polymer systems from b) by forming a film in a silicone pan from a defined amount of polymer dispersion over a period of 4 days at 23° C. and 50% relative humidity, and the films were subjected to the following tests:

1. Determination of the swelling value Q

2 $cm^2$ square film pieces were placed in 100 ml of tetrahydrofuran (THF) for 24 hours at room temperature. The swelling value Q is the THF absorption by the sample, based on the mass of the initial sample in % (determined gravimetrically). The larger Q, the lower is the cohesion.

2. Determination of tensile strength K [$N/mm^2$] and elongation at break D [%]

These tests were carried out according to DIN 53504, at a take-off speed of 200 mm/min, a test temperature of 23° C. and with the use of sample shape S2. The larger K and the smaller D, the more pronounced is the cohesion.

The results obtained are shown in Table 1 below:

TABLE 1

| Polymer system | Q | K | D |
|---|---|---|---|
| SV1 | 963 | 2.7 | 546 |
| SV2 | 943 | 2.7 | 545 |
| SV3 | 712 | 3.5 | 504 |
| S1 | 593 | 4.0 | 416 |
| S2 | 541 | 4.2 | 369 |
| S3 | 487 | 4.5 | 338 |
| S4 | 476 | 4.0 | 304 |

TABLE 1-continued

| Polymer system | Q | K | D |
|---|---|---|---|
| SV5 | 650 | 4.7 | 468 |
| S6 | 428 | 6.4 | 297 |
| S7 | 365 | 6.9 | 240 | d) Preparation of a Coating Material

Coating materials were formulated from the polymer systems S and SV according to the following recipe:

| | |
|---|---|
| Water | 89 g |
| 25% strength by weight aqueous solution of the sodium salt of a copolymer of maleic acid and diisobutylene (dispersant for pigments and fillers) | 6 g |
| Parmetol ® A23 (preservative) | 2 g |
| Natrosol ® 250 HR (4% strength by weight aqueous thickener solution based on hydroxyethylcellulose) | 9 g |
| Propylene glycol | 32 g |
| Butyldiglycol | 10 g |
| Agitan ® 702 (antifoam) | 4 g |
| Kronos ® RHD-2 (finely divided TiO$_2$ pigment) | 210 g |
| Talc SE Micro (filler) | 106 g |
| Collacral PU 75 (polyurethane associative thickener) | 10 g |
| Butyldiglycol | 13 g |
| Kristallöl ® K60 (hydrocarbon mixture as film formation assistant) | 5 g |
| Polymer system S or SV | 504 g | e) Testing the Wet Adhesion of the Coating Materials from d) on an Alkyd Resin Coat First, a high-gloss solvent-containing alkyd resin coating material was applied to a PVC film to give a layer which was 120 μm thick when wet, and the layer was dried for one day at room temperature and for 7 days at 50° C. in a through-circulation drying oven. Thereafter, a 200 μm thick wet layer of a coating material from d) was applied to the alkyd resin coat and was dried for 3 days at 23° C./65% relative humidity. Thereafter, the coat surface was damaged by cutting with a knife, and the films prepared in this manner were subjected to a plurality of successive frost-thaw cycles to test the wet adhesion of the topcoat on the alkyd resin basecoat. Within one frost-thaw cycle, the coated films were first stored for 8 hours in water, then kept for 16 hours at −20° C. and then placed in water for 10 minutes at 23° C. After each frost-thaw cycle, the adhesion of the topcoat on the basecoat was tested at the incision. The wet adhesion results are shown in Table 2.

TABLE 2

| | Basic polymer system | | | | |
|---|---|---|---|---|---|
| | SV1 | SV3 | S3 | SV4 | S5 |
| 1st F-T cycle | poor | completely satisfactory | completely satisfactory | completely satisfactory | completely satisfactory |
| 2nd F-T cycle | | completely satisfactory | completely satisfactory | completely satisfactory | satisfactory |
| 3rd F-T cycle | | completely satisfactory | completely satisfactory | completely satisfactory | satisfactory |
| 4th F-T cycle | | completely satisfactory | completely satisfactory | completely satisfactory | satisfactory |
| 5th F-T cycle | | completely satisfactory | completely satisfactory | completely satisfactory | satisfactory |
| 6th F-T cycle | | completely satisfactory | satisfactory | satisfactory | satisfactory |

We claim:

1. An aqueous polymer composition containing
   A) at least one polymer A dissolved or dispersed in an aqueous medium and composed of polymerized monomers having at least one ethylenically unsaturated carbon-carbon bond, with the proviso that the polymer A has at least one group of the formula I

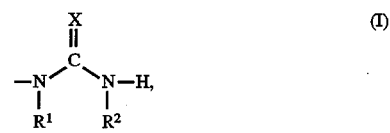

where
   X is O or S and
   R$^1$ and R$^2$ each hydrogen or C$_1$–C$_5$-alkyl or both together form a bridging C$_2$–C$_4$-alkylene group which may be monosubstituted or disubstituted by C$_1$–C$_4$-alkoxy and/or by hydroxyl,
   B) at least one chemical compound B having at least two unprotected and/or reversibly protected aldehyde groups, with the proviso that the molar ratio R of the total amount of groups I contained in the aqueous polymer composition to the total molar amount of unprotected and/or reversibly protected aldehyde groups contained in said composition in the form of compounds B is from 0.1:1 to 10:1,
   and
   C) no hydrazide.

2. An aqueous polymer composition as claimed in claim 1, whose polymer A contains, as group I, a group of the formula

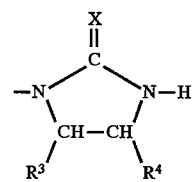

where each of the two substituents R$^3$ and R$^4$ may be hydrogen, hydroxyl or C$_1$–C$_4$-alkoxy.

3. An aqueous polymer composition as claimed in claim 1, whose polymer A contains monomers having groups I, in polymerized form, in amounts of from 0.1 to 30% by weight, based on the total amount of the monomers polymerized in A.

4. An aqueous polymer composition as claimed in claim 1, containing glyoxal as chemical compound B.

5. An aqueous polymer composition as claimed in claim 1, containing a polymer A as chemical compound B.

6. A process for the preparation of an aqueous polymer composition as claimed in claim 1, wherein a monomer mixture which comprises monomers which have a group I is polymerized by the free radical aqueous emulsion polymerization method, and a chemical compound B is stirred into the resulting aqueous polymer dispersion.

7. An aqueous polymer composition as claimed in claim 1, containing from 5 to 50% by weight of polymer A, from 5 to 75% by weight of inorganic fillers or pigments, from 0 to 15% by weight of conventional coating assistants, at least one chemical compound B in an amount such that R is from 0.1:1 to 10:1 and water.

* * * * *